(12) United States Patent
Mandava

(10) Patent No.: US 9,483,247 B2
(45) Date of Patent: Nov. 1, 2016

(54) AUTOMATED SOFTWARE MAINTENANCE BASED ON FORECAST USAGE

(71) Applicant: CA, Inc., Islandia, NY (US)

(72) Inventor: Srikanth Mandava, Hyderabad (IN)

(73) Assignee: CA, Inc., Islandia, NY (US)

( * ) Notice: Subject to any disclaimer, the term of this patent is extended or adjusted under 35 U.S.C. 154(b) by 0 days.

(21) Appl. No.: 14/165,273

(22) Filed: Jan. 27, 2014

(65) Prior Publication Data
US 2015/0212808 A1 Jul. 30, 2015

(51) Int. Cl.
*G06F 9/445* (2006.01)
*G06F 9/48* (2006.01)
*G06F 9/50* (2006.01)
*G06F 11/34* (2006.01)

(52) U.S. Cl.
CPC .............. *G06F 8/65* (2013.01); *G06F 9/4856* (2013.01); *G06F 8/60* (2013.01); *G06F 9/4806* (2013.01); *G06F 9/5038* (2013.01); *G06F 11/3419* (2013.01)

(58) Field of Classification Search
None
See application file for complete search history.

(56) References Cited

U.S. PATENT DOCUMENTS

| | | | | |
|---|---|---|---|---|
| 7,356,770 | B1* | 4/2008 | Jackson | 715/736 |
| 7,584,467 | B2* | 9/2009 | Wickham | G06F 8/65 717/171 |
| 7,688,795 | B2* | 3/2010 | Doshi et al. | 709/208 |
| 8,560,107 | B2* | 10/2013 | Ueda et al. | 700/108 |
| 8,881,132 | B2* | 11/2014 | Mopur et al. | 717/171 |
| 2004/0168171 | A1* | 8/2004 | Comparato | G06F 9/5038 718/106 |
| 2007/0101336 | A1* | 5/2007 | Moore | G06F 8/60 718/102 |
| 2008/0028386 | A1* | 1/2008 | Nagamine et al. | 717/170 |
| 2008/0086229 | A1* | 4/2008 | Ueda et al. | 700/121 |
| 2008/0126498 | A1* | 5/2008 | Doshi et al. | 709/208 |
| 2008/0163227 | A1* | 7/2008 | Son et al. | 718/102 |
| 2009/0204966 | A1* | 8/2009 | Johnson | G06F 9/4856 718/100 |
| 2009/0307347 | A1* | 12/2009 | Cherkasova | G06F 11/3419 709/224 |
| 2010/0229166 | A1* | 9/2010 | Mopur et al. | 717/168 |
| 2012/0266156 | A1* | 10/2012 | Spivak et al. | 717/172 |
| 2013/0205289 | A1* | 8/2013 | Unno | G06F 8/65 717/171 |
| 2013/0346969 | A1* | 12/2013 | Shanmuganathan | G06F 9/4856 718/1 |

(Continued)

OTHER PUBLICATIONS

Brandman, G., Patching the Enterprise, ACM Queue, vol. 3 Issue 2, Mar. 2005, pp. 32-39, [retrieved on Jul. 3, 2016], Retrieved from the Internet: <URL:http://dl.acm.org/>.*

(Continued)

*Primary Examiner* — Thuy Dao
*Assistant Examiner* — Geoffrey St Leger
(74) *Attorney, Agent, or Firm* — Gilliam IP PLLC

(57) ABSTRACT

Various embodiments illustrated and described herein schedule a software upgrade as part of normal workload assignment and management. In one embodiment, a workload automation system evaluates the projected workload on a system affected by a software upgrade. Policies may determine requirements that should be met during the software upgrade, such as jobs that may or may not be postponed, preferred times of software upgrade, etc. The software upgrade may also have constraints associated with it, such as a time by which the upgrade must be completed, the order of upgrade if multiple systems are involved, etc. These constraints may be part of the policies or may be separate. Based on forecasted workload automation, policies, and any other constraints a time slot for software upgrade is selected and the upgrade is scheduled for the time slot as part of a work queue.

15 Claims, 7 Drawing Sheets

(56) References Cited

U.S. PATENT DOCUMENTS

2014/0282582 A1\* 9/2014 Clark .................... G06F 9/4806 718/104
2014/0359596 A1\* 12/2014 Cohen ....................... G06F 8/65 717/173

OTHER PUBLICATIONS

Tom, S., et al., Recommended Practice for Patch Management of Control Systems, Idaho National Laboratory, Dec. 2008, 30 pages, [retrieved on Jul. 3, 2016], Retrieved from the Internet: <URL:https://inldigitallibrary.inl.gov/sti/4121152.pdf>.\*

\* cited by examiner

AUTOMATED SOFTWARE MAINTENANCE BASED ON FORECAST USAGE

BACKGROUND

The disclosure relates generally to software maintenance. More specifically, the disclosure relates to automated software maintenance based on forecast usage.

BRIEF SUMMARY

According to one aspect of the present disclosure a system evaluates the projected workload on a system affected by a software upgrade. A policy may determine requirements that should be met during the software upgrade, such as jobs that may or may not be postponed, preferred times of software upgrade, etc. Based on forecasted workload, policies, and any other constraints, a time slot for software upgrade is selected.

BRIEF DESCRIPTION OF THE DRAWINGS

Aspects of the present disclosure are illustrated by way of example and are not limited by the accompanying figures with like references indicating like elements.

DETAILED DESCRIPTION

Figure 1:
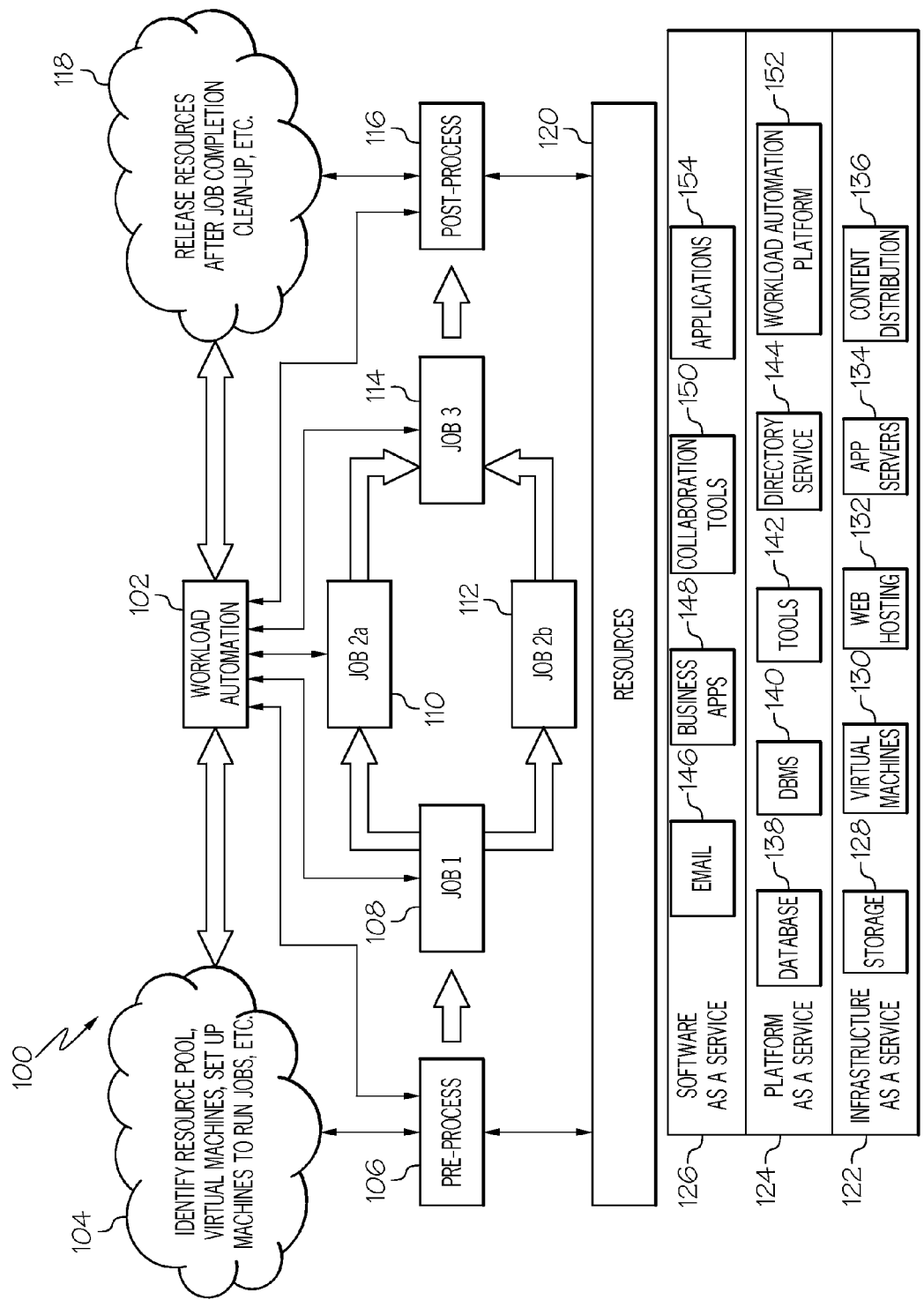
FIG. 1 illustrates an example embodiment of workload automation.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. However, computer readable storage medium does not include computer readable signal medium.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

FIG. 1 illustrates an example embodiment of workload automation, shown generally as 100. In FIG. 1, the workload automation system comprises workload automation component 102. Workload automation component 102 automates multiple workload tasks by identifying resources, allocating work tasks (also referred to as jobs), coordinating among work tasks, etc. as needed to accomplish a sequence of jobs executing on allocated resources to achieve an overall result. These jobs may be, although need not be, distributed across multiple systems and resources in an interlocking fashion, accounting for necessary dependencies. Jobs may be assigned to systems or other resources in work queues so that they are executed in the proper order with the proper inputs and outputs.

Workload automation component 102 may coordinate (or perform) any preprocessing that is needed before the overall work starts, such as identifying an appropriate resource pool, identifying and allocating virtual or actual machines to run jobs, provisioning machines as needed, etc. Task 104 and box 106 illustrate this process. Note that although these tasks are illustrated as occurring before any work is started, the tasks may be performed on an "as needed" basis, so that any processing needed occurs before jobs are allocated and/or started.

The workload automation illustrated in FIG. 1 comprises several jobs, job 108, job 110, job 112, and job 114. As indicated by job 110 and job 112, not all jobs need to be executed in sequence. When a job is complete and/or after the automation is complete, resources may be released as appropriate, any necessary cleanup may be performed, etc. This is illustrated by task 118 and post processing box 116. The workload automation illustrated in FIG. 1 is relatively simple, but in practice, workload automation may be simple, or may require hundreds or thousands of tasks spread across many, many resources. On any given resource, there may be thousands of jobs, sub-jobs, etc. running across the enterprise. When an automated workload, resource, system, the workload automation system itself, etc. needs to be upgraded, the impact can be far reaching, effecting numerous systems, jobs, sub-jobs, etc. In addition, upgrades may need to be timed such that certain systems, components, etc. are upgraded before others. The traditional way of handling this is to simply notify users and take the affected systems offline. In most instances, it is very difficult to identify time slots that will minimize impact on users and/or business operations.

FIG. 1 illustrates the resources needed to perform the automated workload as resources 120. In some embodiments, this may be a single system, or multiple systems that coordinate together to achieve the automated workload. In other embodiments, the automated workload may be executed on a more complicated set of resources, such as resources that make up a private and/or public cloud. The resource model may vary from embodiment to embodiment.

If the resources are part of a cloud-computing model, then such resources may be illustrated as outlined in FIG. 1. The lowest "layer" of a cloud-computing model is generally referred to as Infrastructure as a Service (IaaS). FIG. 1 represents IaaS as layer 122. This layer is the underlying software and hardware layer and may include such infrastructure components as storage 128, virtual machines 130, web hosting capability 132, application servers 134, content distribution mechanisms 136, as well as the underlying hardware (not specifically illustrated).

The next layer is general referred to as Platform as a Service (PaaS). FIG. 1 represents PaaS as layer 124. This layer contains all the platforms, middleware, etc. that are part of the particular cloud implementation under consideration. This may include, for example, databases 138, Database Management System (DBMS) 140, various tools 142, directory services 144, as well many of the components and middleware that underlies the particular workload automation system. Workload automation platform 152 represents these last.

The next layer is generally referred to as Software as a Service (SaaS). FIG. 1 represents SaaS as layer 126. This layer includes the applications and/or services provided, usually to users and/or administrators of the system. This layer may include, for example, email systems 146, business applications 148, collaboration tools 150 and applications 154.

Figure 2:
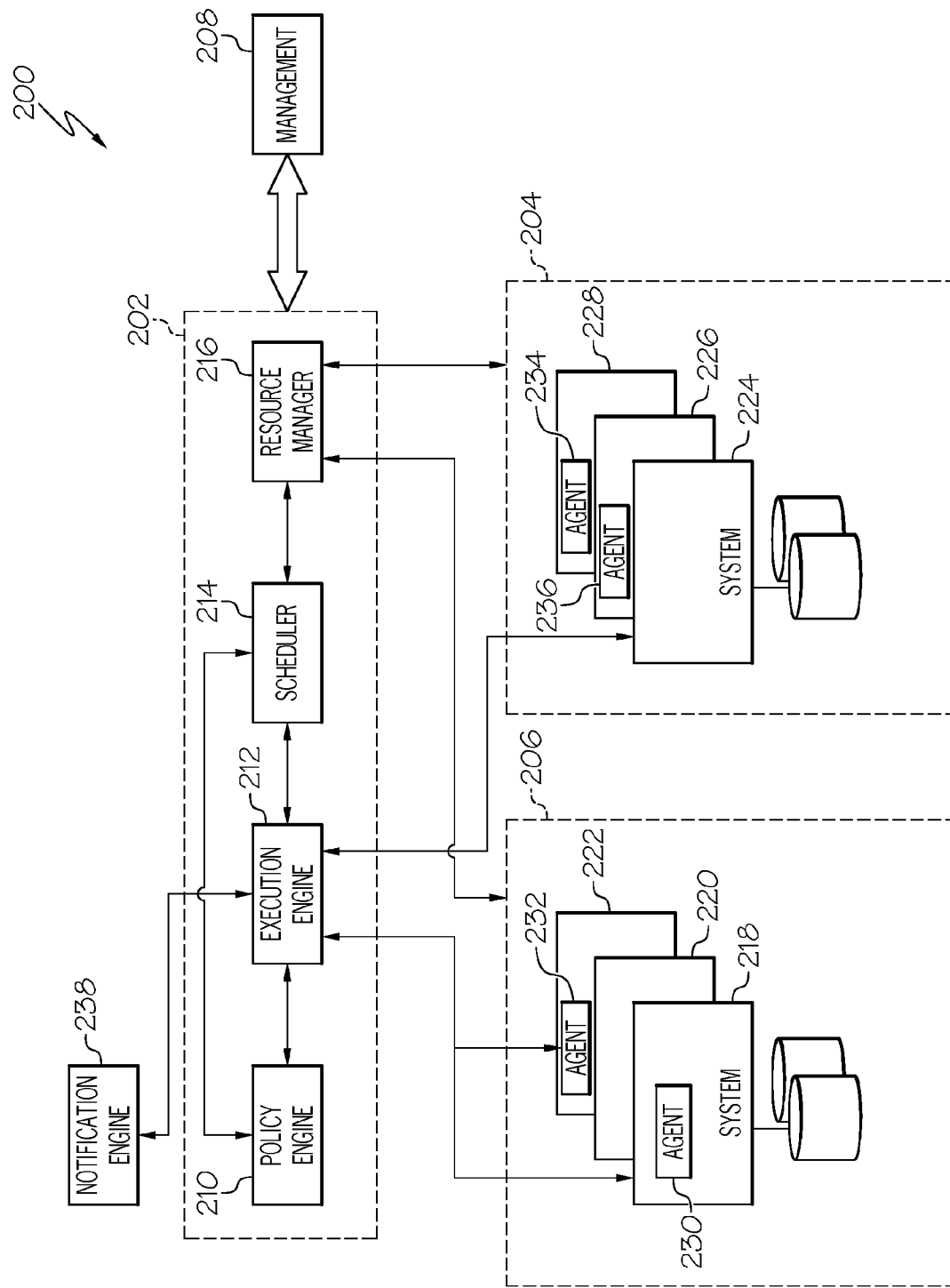
FIG. 2 illustrates an example embodiment of workload automation.

FIG. 2 illustrates an example embodiment of workload automation. The system of FIG. 2 is illustrated generally as 200. Although different embodiments of workload automation systems have different architectures, workload automation embodiments may have basic common functionality. Workload automation system 202 has representative components to provide such functionality. In FIG. 2, workload automation system 202 comprises policy engine 210, execution engine 212, scheduler 214 and resource manager 216. Additionally, workload automation system 202 may be managed in some form. Such management functionality may be part of, or separate from, workload automation system 202. In FIG. 2, management is provided by management component 208.

Resource manager 216 is responsible for managing and coordinating resources needed for an automated workload or upgrade. Thus, resource manager 216 may provision systems and/or virtual machines, ensure that sufficient resources are available for an automated workload, perform any required setup/cleanup, etc. Resource manager 216 may be involved in any aspect of managing resources needed for a workload.

As shown in FIG. 2, resource manager 216 may interact with various systems, illustrated in FIG. 2 in two groups 204 and 206. Systems of a group may comprise an agent (system 218/agent 230, system 222/agent 232, system 226/agent 236 and system 228/agent 234) or may not have an agent (system 220 and system 224). There is no special significance to showing the various systems in groups. However, it does illustrate that in some embodiments, systems are group together in logical or physical groups.

Scheduler 214 interacts with resource manager, execution engine 212 and policy engine 210 to schedule and coordinate workload and upgrades. In one embodiment, scheduler 214 may schedule various jobs that are part of an automated workload as well as upgrades. Scheduler 214 may comprises forecasting capability to forecast schedules and workloads on various systems. In some embodiments, this forecasting capability may be used to load balance among resources to balance utilization (workload). In other embodiments, jobs and/or upgrades may be allocated to systems and scheduler 214 uses forecasting to adjust job and upgrade timing on a particular system. In other words, scheduler 214 may forecast the schedule (and thus workload) on a particular system. In still other embodiments, scheduler 214 may have access to and be able to examine the history of a system to look for patterns, such as times of heavier workload and times of lower workload. Scheduler 214 may schedule upgrades in the same manner as jobs.

Policy engine 210 may comprise policies used to schedule jobs and/or upgrades. Policies may include information relating to upgrades, such as a particular upgrade should be made before a certain date and/or time or that an upgrade has a particular priority for scheduling purposes. Basically anything that should be considered when scheduling an upgrade or a job may be provided by policy engine 210. Thus, policies may be considered to contain constraints and/or instructions and/or considerations that should be taken into account when scheduling an upgrade or job. Policies may come from a variety of sources, such as being associated with a particular job or may come in conjunction with a particular job and/or upgrade. Policies may also be established and managed separately from a job and/or upgrade. In various embodiments, policy engine 210 may have all information that should be considered (e.g., constraints and/or instructions and/or considerations) when scheduling jobs and/or upgrades. In other embodiments, policy engine 210 may provide certain information (e.g., constraints and/or instructions and/or considerations) and other information may be associated with a particular job and/or upgrade and come in some other fashion.

Execution engine 212 (sometimes called an orchestration engine) is responsible for interacting with individual systems and resources and carrying out coordination and scheduling to accomplish an automated workload and/or upgrade. In these interactions, execution engine may rely on agents, for those systems that comprise agents. Agents may receive instructions and/or information from execution engine to ensure that jobs and/or upgrades are started and performed properly. As such, agents may comprise a work queue of jobs and/or upgrades that should be performed at a designated time. Agents use system resources to accomplish the assigned tasks. For systems without agents, execution engine 212 may simply issue the proper commands to the system using remote access technology or may coordinate with another entity that, in turn, provides the functionality of an agent by issuing remote commands to the system. As previously explained, agents 230, 232, 234 and 236 are examples of such agents.

Execution engine 212 may interact with notification engine 238 to provide notifications to other entities, such as systems, users, etc. For example, in one embodiment, when upgrades are scheduled, a report may be generated and provided to a user/administrator. Notifications of scheduled system upgrades may be provided to users via notification engine 238.

Figure 3:
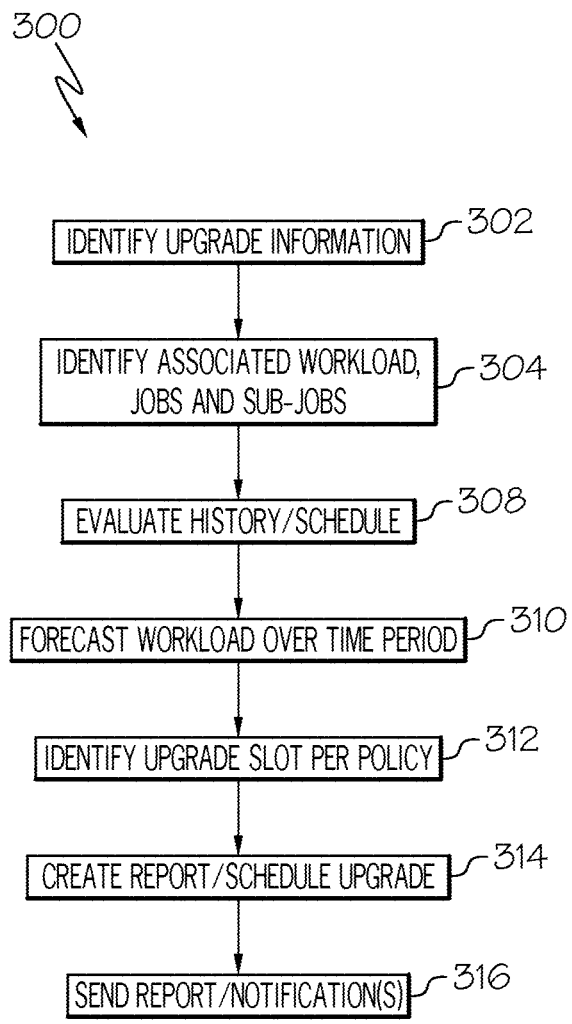
FIG. 3 illustrates an example flow diagram for scheduling software maintenance based on forecast usage.

FIG. 3 illustrates an example flow diagram for scheduling software maintenance based on forecast usage, shown generally as 300. When an automated workload, resource, system, the workload automation system itself, etc. needs to be upgraded, information about the upgrade may be identified. Operation 302 of FIG. 1 illustrates this process. The identified information may include, for example, timing of the upgrade (e.g., needs to be completed by a certain date/time), the particular components that need to be upgraded, the new components, etc. To schedule the upgrade, embodiments may identify information that 1) allows the systems and components to upgraded to be identified so that all affected workloads, jobs, sub-jobs, etc. may be identified along with any systems that they execute on, if affected, and 2) any timing constraints on the scheduling that need to be accommodated.

Once upgrade information is identified, the tasks of identifying affected workloads, jobs, sub-jobs, systems, etc. may be performed. These are illustrated in FIG. 3 by operation 304. The result of this operation is to identify an affected system with its accompanying jobs. To arrive at this, it is possible to identify workloads, jobs, sub-jobs, etc. and track them to the systems that they are scheduled to execute on or identify the system and then identify the workloads, jobs, sub-jobs, etc. that are scheduled to execute thereon. If resources are allocated dynamically or it is difficult to identify a particular system with its accompanying workloads, jobs, sub-jobs, etc., the forecasting capability (such as provided by scheduler 214) may be utilized to identify when and where the workload, job, sub-job, etc. are or will be scheduled to execute.

Once a system with its accompanying workloads, jobs, sub-jobs, etc. has been identified, the next phase is to identify a time slot for the upgrade. This may be accomplished in a variety of ways. In one example, if execution history is available, examining the execution history may identify a time period within which a suitable time slot is likely to exist. Although not strictly true on systems that use load balancing to even out workload among systems in a dynamic fashion, many systems tend to have patterns of utilization. Systems may be loaded more heavily during certain working hours and more lightly loaded during other hours. By examining the workload history of a system, it may be possible to identify patterns and from that, identify a time period within which a time slot may likely exist. Operation 308 represents examining the workload history and identifying a likely time period as discussed.

Once a likely time period has been identified, the workload for that time period may be forecast. This forecast will then be used, in conjunction with policies and other constraints, to select a time slot for the upgrade. The forecast may be provided by whatever system and/or components that are used to forecast workload in the system. Operation 310 represents forecasting workload over the period of interest.

Finally, policies may be used to identify a time slot for the upgrade. Policies may come from a repository (or multiple repositories) and be provided by an engine or may be associated with workloads and/or jobs and/or sub jobs and/or upgrades, etc. in some other fashion. For example, such policies may be uploaded to the system when the patch/upgrade is uploaded. As previously mentioned, policies may include any constraints or considerations used to select a time slot. Critical workloads, jobs, sub jobs that cannot be postponed or interrupted for an upgrade, this constraint may be indicated as part of a policy. Hours that the system must be available may also be indicated as part of a policy. If an upgrade has a certain order that items must be upgraded in, that may also be part of a policy. If an upgrade has a priority (relative to a job, etc.) that may also be part of a policy. These are provided by way of example and not limitation. Operation 312 represents applying policies and selecting an upgrade slot.

The above describes use of workload, execution history, forecasted workload and policies to select a time slot by applying the processes in a particular order. This order is given simply by way of example and for purposes of explanation. The particular order is not important, and may vary from embodiment to embodiment or even from time to time within a given embodiment. In one embodiment, the system may start with whatever data or information that will exclude the largest segments of time. For example, if a policy states that upgrades may not happen during particular working hours, there is no need to examine execution history or forecasted workload during working hours. However, if that same policy also states that upgrades may not happen when a particular job is executing, it may be desirable to examine forecasted workloads to identify when that job is forecasted to execute and next exclude those time slots. At that point, perhaps a time slot may be selected that meets the remainder of the policy considerations. Thus, in this example examining the execution history is not even necessary. In other examples, time slots that meet designated policy (or policies) may be identified without considering forecasted workload or other factors. Thus, only those factors and information that are needed to identify a time slot for upgrade that meets the designated policy or policies need be used.

Once a time slot has been identified, various embodiments may handle what happens next in various ways. In one example embodiment, the workload automation system automatically schedules upgrades using the workload automation system functionality so that the upgrade is scheduled like any other workload, job, sub-job, etc. In another example embodiment, a report may be generated including the selected time slot with or without a few optional time slots (possibly in recommended order) and an administrator, system, user or other entity may select which time slot to use. Once the entity selects the time slot, the system may schedule the upgrade for the selected time slot using the workload automation functionality. If the system is to provide a few recommended slots for an entity to select from, then the selection process, like operations 308, 310, and 312 of FIG. 3, should select a few slots that meet the designated policy and place them in recommended order if possible and/or desired. The process of creating slot recommendations and/or scheduling them is illustrated in FIG. 3 by operation 314.

After, or in conjunction with, selecting and scheduling the upgrade, appropriate notifications may be sent out. Such notifications may include reports of information, notifications to users of system unavailability, etc. Operation 316 represents this process.

The discussion of FIG. 2 and FIG. 3 have been presented in such a way to indicate that workload scheduling may be more of a centralized function or may be more of a distributed function, or some combination thereof. In some embodiments, workload automation has a more centralized implementation where, for example, workload automation system 202 resides on one machine and that machine coordinates resources, such as machines in groups 204 and/or 206 to accomplish workload automation. In other embodiments, each machine may contain part or all of the functionality illustrated in workload automation system 202 and may coordinate with other like machines to accomplish the workload automation. In still other embodiments, some of the functionality of workload automation system 202 resides in a more centralized fashion, while other resides on various systems in a distributed fashion.

Figure 4:
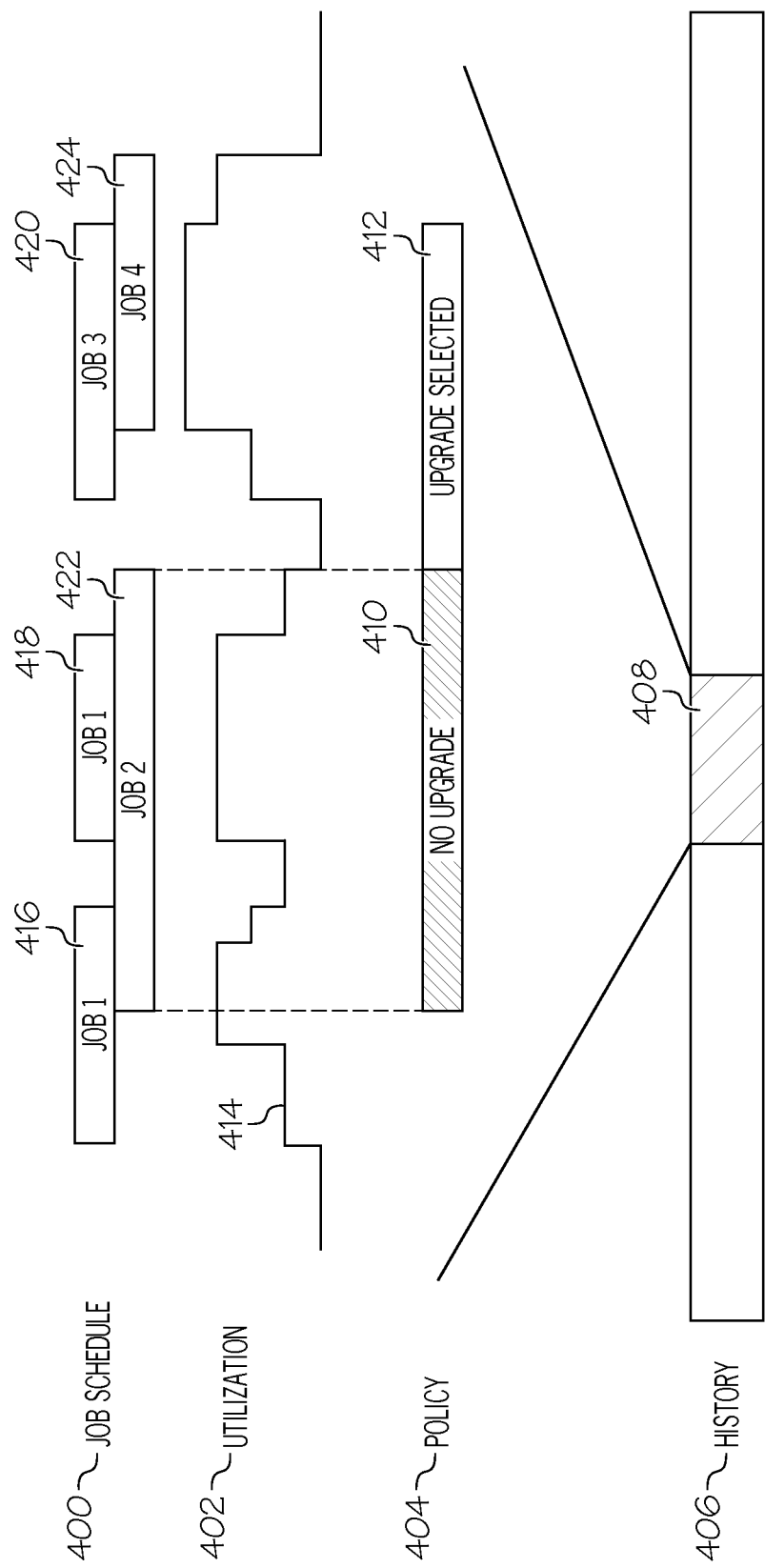
FIG. 4 illustrates an example embodiment to identify a time slot for software maintenance based on forecast usage.

FIG. 4 illustrates an example embodiment to identify a time slot for software maintenance based on forecast usage. As before, some or all of these factors may be used to select the time slot. History 406 represents the execution history (sometimes referred to as workload history) for this particular system. By examining history 406, it may be possible to identify a time period where a likely time slot may exist. In FIG. 4, this time period is illustrated by time period 408. Time period 408 may be over any particular time frame. For example, the history may indicate that during the hours of 22:00 to 02:00 each day a time period to examine may exist. In another example, on Wednesday each week a time period to examine may exist. In yet another example, each month on the second Sunday and a particular start time, a time period to examine may exist. Thus, time periods to examine may exist on a daily, weekly, monthly, yearly, or some other basis.

The next (or next several) future occurrence of time period 408 may be examined for appropriate time slots. Job schedule 400 represents the forecasted jobs that will execute over the next future occurrence of time period 408. As indicated in FIG. 4, job 1 is scheduled to execute on a periodic basis as indicated by job 416 and job 418. Jobs 420, 422 and 424 are also scheduled to execute in the indicated time slots.

In some embodiments, it may be sufficient to simply look at the number of jobs executing during a given time to identify the workload of the system over the time period being examined. In other embodiments, it may be desirable to look at projected loads on the system for the various scheduled jobs. This is because not all jobs utilize the same amount or type of resources on a system. Thus, measures like projected CPU load, projected memory usage, projected disk utilization, etc. may be used to predict overall system workload, if desired. In this disclosure the term "utilization" will be used to designate either or both of these scenarios (e.g., number of jobs and/or some other utilization factor and/or some combination of number of jobs and/or utilization factors). Graph 414 from utilization line 402 represent projected utilization over the time period.

Policy line 404 represents the policy or policies to be applied when selecting a time slot. In the embodiment of FIG. 4, the policy indicates that job 422 should preempt any scheduled upgrade. Thus, the time associated with job 422 is unavailable for an upgrade as indicated by the no upgrade slot 410. Examining the remainder of the options available, time slot 412 is selected for upgrade. In some embodiments, when the system discovers that the majority of time period 408 is unavailable for upgrades, the system may extend the search beyond time period 408 in order to see if there are other time periods of lower utilization that may be appropriate for upgrade.

Figure 5:
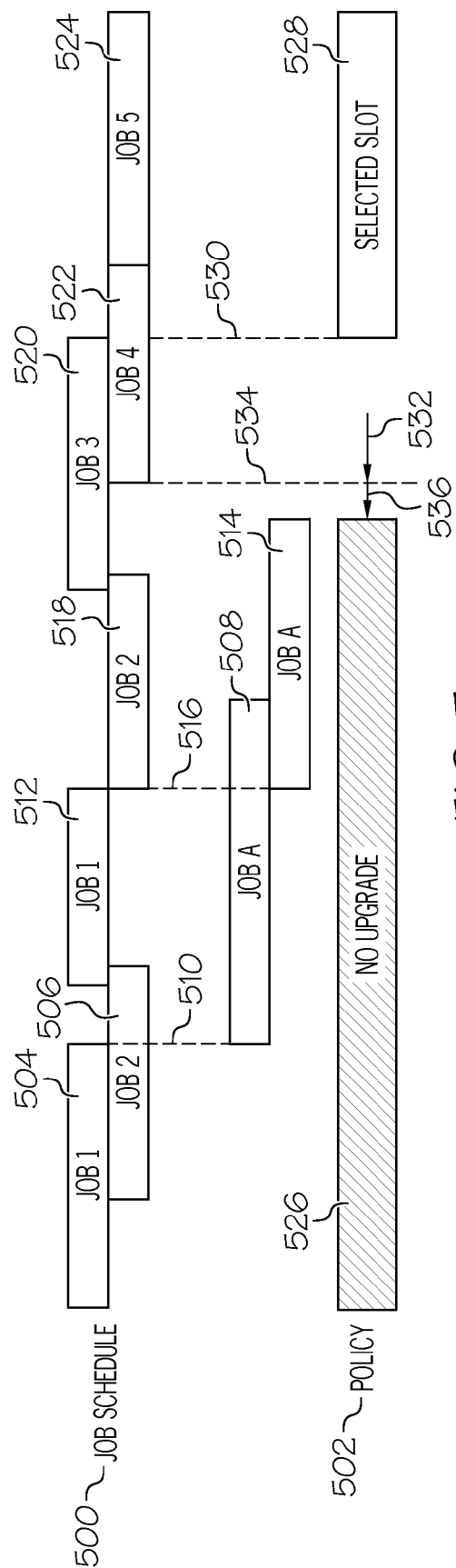
FIG. 5 illustrates an example embodiment to identify a time slot for software maintenance based on forecast usage.

FIG. 5 illustrates an example embodiment to identify a time slot for software maintenance based on forecast usage. FIG. 5 illustrates job schedule 500 and policy 502. A workload history and utilization are not illustrated. In this embodiment, utilization is correlated to the number of jobs executing at any one time and thus, the job schedule is sufficient to identify utilization.

Job schedule 500 shows a plurality of jobs that are scheduled to run at various time slots. In the job schedule job 508 is dependent on job 504 as illustrated by dashed line 510 and job 514 is dependent on job 512 as illustrated by dashed line 516. Looking at job schedule 500, the lowest utilization begins after job 520 finishes running Thus, selected time slot 528 (the time slot selected for the upgrade) may start after job 520 finishes as shown by dashed line 530. Examining job schedule 500, the selected time shot will not allow job 522 to finish executing, so job 522 (as well as job 524) will need to be rescheduled after the upgrade. If job 522 is rescheduled, that leaves job 520 as the only job executing.

Depending on whether it is more important to schedule the upgrade or allow job 520 to finish, selected time slot 528 may be shifted in time. Assuming a policy prioritizes the upgrade over job 520, the selected time slot may be moved forward in time to dashed line 534 as shown by arrow 532 (the starting time of job 522). This leaves job 520 as unable to finish so job 520 will also need to be rescheduled. This means that from a utilization standpoint, the upgrade may be shifted even farther forward in time. In the example of FIG. 5, however, the policy indicates that job 504, 508, 512 and 514 may not be preempted by the upgrade due to priority or some other factor. Thus, the farthest forward in time the selected slot 528 may be shifted is to start after the execution of job 514 finishes as shown by arrow 536. Thus, the system may choose to move the upgrade slot 528 forward to start after job 514 finishes. Job 520, 522 and 524 may be rescheduled as appropriate.

Figure 6:
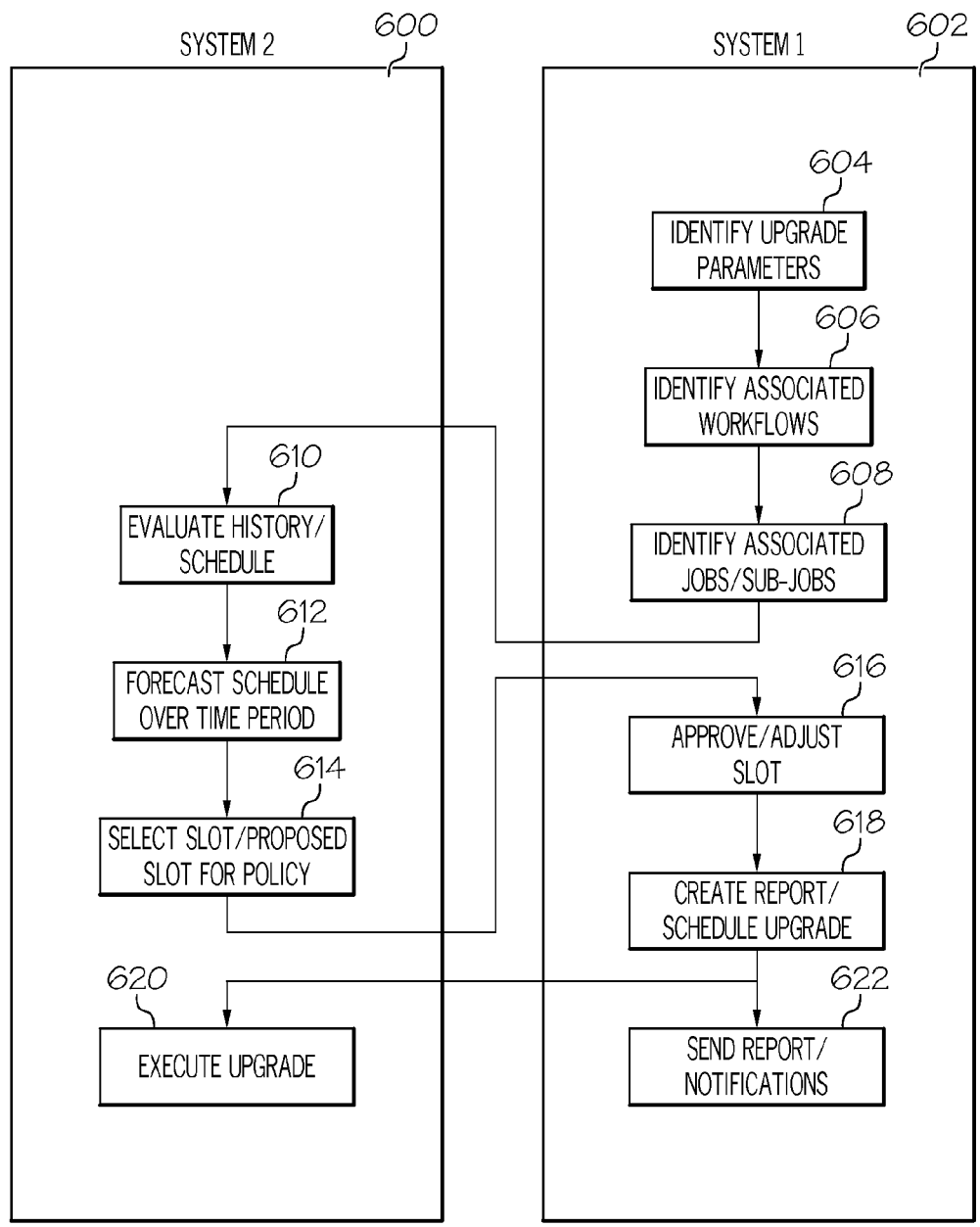
FIG. 6 illustrates an example flow diagram for scheduling software maintenance based on forecast usage.

FIG. 6 illustrates an example flow diagram for scheduling software maintenance based on forecast usage. As previously discussed, some embodiments may be more distributed (as opposed to centralized). The embodiment of FIG. 6 illustrates two systems working together to schedule an upgrade for one of the systems. Specifically, system 600 and system 602 work together to perform an upgrade of system 600.

In the embodiment of FIG. 6, system 602 identifies the upgrade parameters, including any constraints on the upgrade in operation 604. The system then identifies the workloads, jobs, sub-jobs, and/or systems affected by the upgrade as indicated in operations 606 and 608. In an alternative embodiment, system 602 may only do enough work to identify the systems affected by the upgrade. Identification of the workloads, jobs, sub-jobs, etc. may be left to the affected systems. This would have the effect of moving operation 606 and/or 608 to the other system (600 in the embodiment of FIG. 6).

System 600 is then informed of the upgrade and system selects an appropriate upgrade slot. This may be accomplished, for example, by evaluating the utilization history as indicated by operation 610. System 600 may then forecast the utilization over a time period as indicated by operation 612. Once that is done, then the system may select a time slot that complies with the appropriate policies as indicated by operation 614. Rather than select a time slot, in an alternate embodiment, system 600 may simply select one or more proposed time slots and return the proposed slot to system 602.

After the selected (or proposed) time slot(s) are returned to system 602, system 602 may adjust and/or approve the time slot if the embodiment grants that authority to system 602 rather than system 600 as indicated by operation 616. If, however, the authority to select a time slot resides with system 602, then operation 616 would not be executed by system 600.

System 602 may then generate any appropriate reports and/or schedule the upgrade at the appropriate time slot as part of the work queue of system 600 as indicated in operation 618. In alternate embodiments, system 600 may schedule its own work queue, in which case system 600 would perform some or all of the functions of operation 618.

After the upgrade is scheduled, system 602 may send any appropriate reports and/or notifications as indicated by operation 622. At the appointed time, system 602 performs the upgrade as indicated by operation 620.

Figure 7:
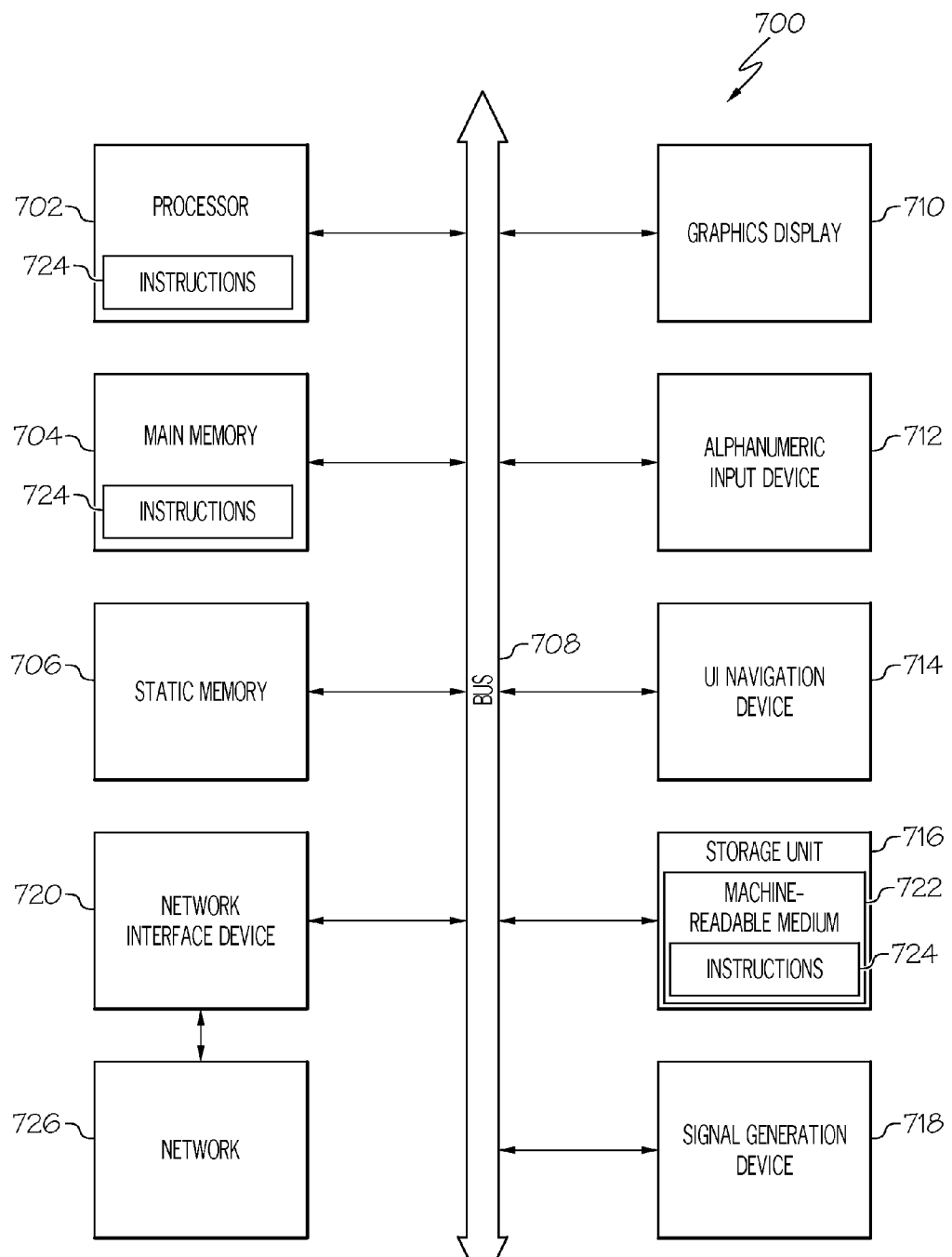
FIG. 7 illustrates an example embodiment of a device suitable for use herein.

FIG. 7 is a block diagram of a computer processing system, within which a set of instructions for causing the computer to perform any one or more of the methodologies discussed herein may be executed.

Embodiments may also, for example, be deployed by Software-as-a-Service (SaaS), Application Service Provider (ASP), or utility computing providers, in addition to being sold or licensed via traditional channels. The computer may be a server computer, a personal computer (PC), a tablet PC, a set-top box (STB), a personal digital assistant (PDA), cellular telephone, or any processing device capable of executing a set of instructions (sequential or otherwise) that specify actions to be taken by that device. Further, while only a single computer is illustrated, the term "computer" shall also be taken to include any collection of computers that individually or jointly execute a set (or multiple sets) of instructions to perform any one or more of the methodologies discussed herein.

The example computer processing system 700 includes processor 702 (e.g., a central processing unit (CPU), advanced processing unit (APU), a graphics processing unit (GPU) or combination thereof), main memory 704 and static memory 706, which communicate with each other via bus 708. The processing system 700 may further include graphics display 710 (e.g., a plasma display, a liquid crystal display (LCD) or a cathode ray tube (CRT) or other display). The processing system 700 also includes alphanumeric input device 712 (e.g., a keyboard), a user interface (UI) navigation device 714 (e.g., a mouse, touch screen, or the like), a storage unit 716, a signal generation device 718 (e.g., a speaker), and a network interface device 720.

The storage unit 716 includes machine-readable medium 722 on which is stored one or more sets of data structures and instructions 724 (e.g., software) embodying or utilized by any one or more of the methodologies or functions described herein. The instructions 724 may also reside, completely or at least partially, within the main memory 704 and/or within the processor 702 during execution thereof by the processing system 700, with the main memory 704 and the processor 702 also constituting computer-readable, tangible media.

The instructions 724 may further be transmitted or received over network 726 via a network interface device 720 utilizing any one of a number of well-known transfer protocols (e.g., HTTP).

While the machine-readable medium 722 is shown in an example embodiment to be a single medium, the term "machine-readable medium" should be taken to include a single medium or multiple media (e.g., a centralized or distributed database, and/or associated caches and servers) that store the one or more sets of instructions 724. The term "machine-readable medium" shall also be taken to include any medium that is capable of storing, encoding or carrying a set of instructions for execution by the computer and that cause the computer to perform any one or more of the methodologies of the present application, or that is capable of storing, encoding or carrying data structures utilized by or associated with such a set of instructions. The term "machine-readable medium" shall accordingly be taken to include, but not be limited to, solid-state memories, and optical and magnetic media.

While various implementations and exploitations are described, it will be understood that these embodiments are illustrative and that the scope of the claims is not limited to them. In general, techniques for maintaining consistency between data structures may be implemented with facilities consistent with any hardware system or hardware systems defined herein. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the claims. In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the claims.

While the embodiments are described with reference to various implementations and exploitations, it will be understood that these embodiments are illustrative, and that the scope of claims provided below is not limited to the embodiments described herein. In general, the techniques described herein may be implemented with facilities consistent with any hardware system or hardware systems defined herein. Many variations, modifications, additions, and improvements are possible.

The flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The embodiments illustrated herein are described in sufficient detail to enable those skilled in the art to practice the teachings disclosed. Other embodiments may be used and derived there from, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A computer implemented method comprising:
   determining a software upgrade to be performed for a first system;
   forecasting utilization of the first system based, at least in part, on a schedule of a plurality of jobs to be executed on the first system and historical data of the first system;
   determining a first policy associated with a first job of the plurality of jobs, wherein the first job cannot be postponed based on the first policy;
   determining a second policy associated with a second job of the plurality of jobs, wherein the second job can be postponed based on the second policy;
   determining that the software upgrade has to be completed by a deadline;
   determining that the first job prevents the software upgrade from being completed by the deadline;
   in response to determining that the first job prevents the software upgrade from being completed by the deadline, assigning the first job to be executed on a second system;
   determining that the second job prevents the software upgrade from being completed by the deadline;
   in response to determining that the second job prevents the software upgrade from being completed by the deadline, postponing execution of the second job to after the deadline;
   selecting a time before the deadline for the software upgrade based, at least in part, on the schedule of the plurality of jobs, the reassignment of execution of the first job, the postponement of execution of the second job, the deadline, and the forecasted utilization; and
   scheduling the software upgrade to be executed at the selected time.

2. The method of claim 1 further comprising:
   selecting a plurality of times for the software upgrade based, at least in part, on the schedule of the plurality of jobs, the deadline, and the forecasted utilization, wherein the plurality of times include the selected time; and
   generating a report that indicates the plurality of times.

3. The method of claim 1, wherein said forecasting utilization of the first system based, at least in part, on a schedule of a plurality of jobs to be executed on the first system and historical data of the first system comprises forecasting utilization of the first system for a period of time based, at least in part, on a schedule of a plurality of jobs to be executed on the first system and historical data of the first system, wherein the period of time complies with the deadline.

4. The method of claim 1 further comprising generating a report including the selected time.

5. The method of claim 1 further comprising delegating selecting a time for the software upgrade to a third system.

6. A first system comprising:
a processor;
a memory device;
a computer readable storage medium having computer readable program code, the program code executable by the processor to cause the first system to:
determine a software upgrade to be performed for a second system;
forecast utilization of the second system based, at least in part, on a schedule of a plurality of jobs to be executed on the second system and historical data of the second system;
determine a first policy associated with a first job of the plurality of jobs, wherein the first job cannot be postponed based on the first policy;
determine a second policy associated with a second job of the plurality of jobs, wherein the second job can be postponed based on the second policy;
determine that the software upgrade has to be completed by a deadline;
determine whether the first job prevents the software upgrade from being completed by the deadline;
in response to a determination that the first job prevents the software upgrade from being completed by the deadline, assign the first job to be executed on a third system;
determine whether the second job prevents the software upgrade from being completed by the deadline;
in response to a determination that the second job prevents the software upgrade from being completed by the deadline, postpone execution of the second job to after the deadline;
select a time before the deadline for the software upgrade based, at least in part, on the schedule of the plurality of jobs, the reassignment of execution of the first job, the postponement of execution of the second job, the deadline, and the forecasted utilization; and
schedule the software upgrade to be executed at the selected time.

7. The first system of claim 6, wherein the program code executable by the processor to cause the first system to forecast utilization of the second system based, at least in part, on a schedule of a plurality of jobs to be executed on the second system and historical data of the second system comprises program code executable by the processor to cause the first system to forecast utilization of the second system for a period of time based, at least in part, on a schedule of a plurality of jobs to be executed on the second system and historical data of the second system, wherein the period of time complies with the deadline.

8. The first system of claim 6 further comprising program code executable by the processor to cause the first system to delegate selecting a time for the software upgrade to the second system.

9. The system of claim 6 further comprising program code executable by the processor to cause the first system to generate a report including the selected time.

10. The first system of claim 6 further comprising program code executable by the processor to cause the first system to:
select a plurality of times for the software upgrade based, at least in part, on the schedule of the plurality of jobs, the deadline, and the forecasted utilization, wherein the plurality of times include the selected time; and
generate a report that indicates the plurality of times.

11. A computer product comprising:
a non-transitory computer readable storage medium having computer readable program code embodied therewith, the computer readable program code to:
determine a software upgrade to be performed for a first system;
forecast utilization of the first system based, at least in part, on a schedule of a plurality of jobs to be executed on the first system and historical data of the first system;
determine a first policy associated with a first job of the plurality of jobs, wherein the first job cannot be postponed based on the first policy;
determine a second policy associated with a second job of the plurality of jobs, wherein the second job can be postponed based on the second policy;
determine that the software upgrade has to be completed by a deadline;
determine whether the first job prevents the software upgrade from being completed by the deadline;
in response to a determination that the first job prevents the software upgrade from being completed by the deadline, assign the first job to be executed on a second system;
determine whether the second job prevents the software upgrade from being completed by the deadline;
in response to a determination that the second job prevents the software upgrade from being completed by the deadline, postpone execution of the second job to after the deadline;
select a time before the deadline for the software upgrade based, at least in part, on the schedule of the plurality of jobs, the reassignment of execution of the first job, the postponement of execution of the second job, the deadline, and the forecasted utilization; and
schedule the software upgrade to be executed at the selected time.

12. The computer program product of claim 11, wherein the computer readable program code to schedule the software upgrade at the selected time comprises computer readable program code to schedule the software upgrade at the selected time as a workload assignment for the first system.

13. The computer program product of claim 11 further comprising computer readable program code to generate a report that includes the selected time.

14. The computer program product of claim 11 further comprising computer readable program code to:
select a plurality of times for the software upgrade based, at least in part, on the schedule of the plurality of jobs, the deadline, and the forecasted utilization, wherein the plurality of times include the selected time; and
generate a report that indicates the plurality of times.

15. The computer program product of claim 11 further comprising computer readable program code to delegate selecting a time for the software upgrade to a third system.

* * * * *